No. 713,000. Patented Nov. 4, 1902.
W. H. FORD.
MOLD CUTTER.
(Application filed Aug. 11, 1902.)
(No Model.)
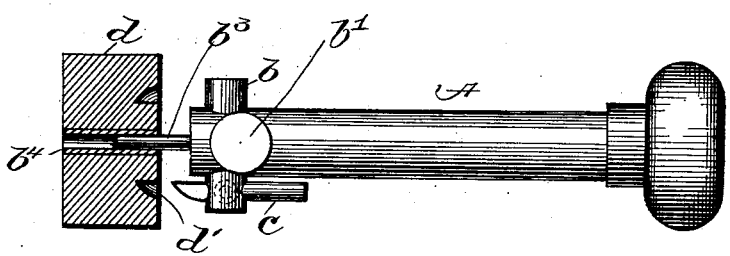
Witnesses
J. M. Fowler Jr.
W. C. Lunsford.
Inventor
William H. Ford,
by Crosby Gregory.
Attorneys

UNITED STATES PATENT OFFICE.

WILLIAM H. FORD, OF LOWELL, MASSACHUSETTS, ASSIGNOR TO RINGSET COMPANY, OF BOSTON, MASSACHUSETTS, A CORPORATION OF MAINE.

MOLD-CUTTER.

SPECIFICATION forming part of Letters Patent No. 713,000, dated November 4, 1902.

Original application filed December 6, 1900, Serial No. 38,868. Divided and this application filed August 11, 1902. Serial No. 119,154. (No model.)

*To all whom it may concern:*

Be it known that I, WILLIAM H. FORD, a citizen of the United States, and a resident of Lowell, in the county of Essex and State of Massachusetts, have invented an Improvement in Mold-Cutters, of which the following description, in connection with the accompanying drawing, is a specification, like letters on the drawing representing like parts.

The invention to be hereinafter described relates to devices for cutting mold spaces or cavities in charcoal or any other soft material in which to cast such articles as finger-rings and the like.

In cutting the mold space or cavity it is desirable that the material be held in proper relation to the cutting-tool, and as one means of securing this relation I have shown a device having a centering-pin which is adapted to engage a hole or recess in said material. From the soft and yielding character of the charcoal or other material it is evident that relative rotative movement between the centering-pin and the material during the cutting of the mold space or cavity will cause the material to wear and the hole or recess to become enlarged, resulting in an inaccurate cutting of the mold-space and improper assemblage of the parts of the mold prior to casting, as will be obvious. To overcome these objections, I insert in the mold material at the center of the mold-space a bushing to be entered by a centering-pin extended from the shaft or spindle of the cutting device, said pin and bushing acting in a measure to steady the mold material and prevent wear of the latter, the bushing also serving to receive a pin or device when assembling the parts of the mold in position to receive the molten metal in their alined mold-spaces. The employment of the bushing prevents any enlargement of the hole or recess in the charcoal, and this insures that the mold parts when put together with their mold-spaces in contact will exactly aline one with the other, for otherwise a correct ring could not be cast.

The drawing shows in side elevation a cutting device and in section a piece of mold material having a bushing therein which is engaged by the centering-pin.

In the drawing, A represents any desired form of device for cutting a mold space or cavity in mold material and comprises a handle or spindle portion having at or near one end a tool-carrier $b$, (shown as adjustable at right angles to the longitudinal axis of the handle or spindle and preferably held in adjusted position by a suitable set-screw $b'$,) the handle or spindle being bored transversely to receive the tool-carrier, as shown. The tool-carrier is adapted to receive the shank of a tool C, having its acting end shaped to cut in the mold material an annular groove having side walls shaped to correspond in form with the form desired for the inner and outer faces of the circular casting, as a ring, to be produced by filling the mold-space with molten metal. The tool, it will be understood, is located eccentrically with relation to the longitudinal axis of the handle or spindle, and the degree of eccentricity of the tool may be varied by adjusting it toward and from the longitudinal axis of the handle or spindle, according to the size of mold-space to be cut, and this adjustment may be effected by or through moving the tool-carrier in the handle or spindle.

Mounted axially of the handle or spindle and extended beyond the end thereof is the centering-pin $b^3$, a central bore being preferably provided in the end of the handle or spindle to receive the pin $b^3$, although any means for holding the parts in stated relation may be employed.

The mold material $d$, preferably of charcoal, has that side of it which is to be provided with the mold-space $d'$ cut to present a plane surface, and the mold material will be preferably bored at right angles to said face, a bushing $b^4$, of metal, being inserted in the hole or recess thus formed. This bushing and hole will occupy a position exactly central with relation to the mold-space. During the formation of the mold-space by the tool C the pin $b^3$ at the end of the handle or spindle will be engaged with the bushing $b^4$, and said pin $b^3$ being fixed to the handle or spindle will turn in the bushing upon relative rotative movement being imparted to the cutting device and mold material, the bushing under these conditions preventing wear of the mold material and consequent enlargement of the hole or recess, which if it occurred would render the accurate formation of the mold-space impossible and thereafter also prevent the proper centering of the two mold-halves with relation to each other. With the bushing in the mold material the latter may, if desired, be held in one hand and the handle or spindle in the other, and with the pin $b^3$ entering the bushing the mold material and handle or spindle may be relatively rotated to produce the mold-space, the bushing and pin acting to give steady support and reliable connection between the mold material and cutting device without liability of enlargement of the hole or recess, with its resulting disadvantages.

While I have shown the cutting device comprising the specific details enumerated, it is to be understood that the invention is not limited thereto, as the same may be varied between wide limits.

Having thus described my invention, what I claim, and desire to secure by Letters Patent, is—

A block of mold material substantially as described having a perforation therethrough, and a bushing seated in said perforation, in combination with a cutting-tool adapted to cut a ring-groove in the face of said mold material, and having a centering-pin conforming to and fitting within the bushing.

In testimony whereof I have signed my name to this specification in the presence of two subscribing witnesses.

WILLIAM H. FORD.

Witnesses:
GEO. W. GREGORY,
EDITH M. STODDARD.